Feb. 16, 1943. F. A. M. OLDHAM 2,311,077
MEANS FOR GLAZING WINDOWS
Filed April 10, 1941
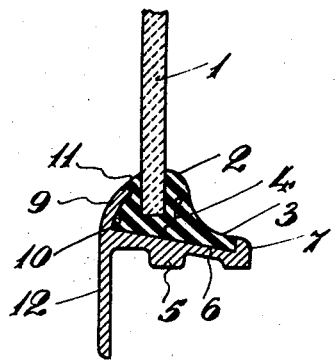
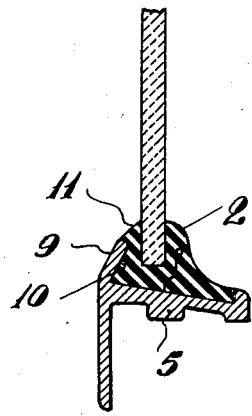
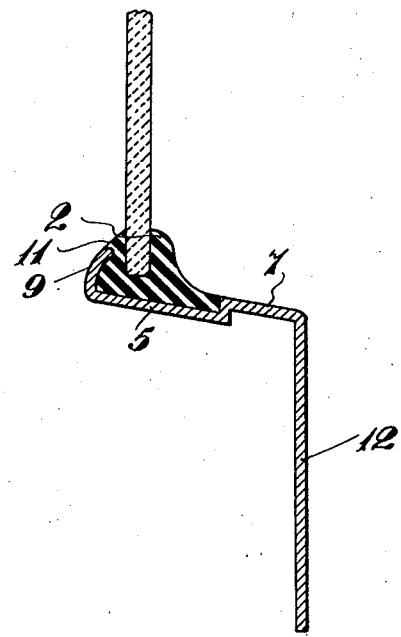
INVENTOR
Fred Alexander Mayhew Oldham
BY
Joseph J. Juhasz
ATTORNEY.

Patented Feb. 16, 1943

2,311,077

UNITED STATES PATENT OFFICE 2,311,077

MEANS FOR GLAZING WINDOWS

Fred Alexander Maugham Oldham, Birmingham, England, assignor by direct and mesne assignments of one-third to Arthur Sam Cheston, one-third to Edward Cyril Edmonds and one-third to Basil Cheston, all of Birmingham, England Application April 10, 1941, Serial No. 387,969
In Great Britain November 9, 1939

1 Claim. (Cl. 189—78)

This invention relates to means for glazing windows, said means being of the kind in which the window pane is inserted in a groove or channel of a rubber edging strip provided or associated with a flexible retaining flange or member adapted, when the edging strip and window pane are inserted laterally into a surrounding frame, to engage with a recess within, or behind a lip or flange upon, the base of the frame; such as described, for example, in United States Patent No. 2,056,024.

In the glazing means described in the said Patent No. 2,056,024 the rear upstanding wall of the window frame was provided at its edge with an overhanging lip or flange beneath which the rear wall of the channelled edging strip was engaged, in order to prevent the rear portion of the strip from rising.

The object of the present invention is to provide improved retaining means for holding down the strip upon the base of the frame and thus preventing the same from rising, which admits of the said strip being more readily engaged with said retaining means during the mounting of the strip and window panel within the frame.

According to the invention, window glazing means, the base of the frame upon which the channelled edging strip rests, is provided with an integral upstanding rear wall which is inwardly curved or inclined so as to overhang the base, and the rear wall of the strip is correspondingly shaped to co-operate and mate with said frame wall, the latter being designed to form a curved or inclined lead which, when engaged by the strip, co-operates therewith to cause the said strip to be automatically bedded down on to the base during the mounting of the window panel within the frame.

Figure 1 of the accompanying drawing is a cross-section of a window mounting according to the construction described and illustrated in Patent No. 2,056,024 but modified in accordance with the present invention.

Figures 2 and 3 illustrate modifications.

Referring to Figure 1 of the drawing, the edges of the window panel 1 which is to be fitted in the window aperture, have one or more grooved rubber strips or channels 2 fitted to them. Each of these strips 2 is generally of the channel form shown in Figures 1 to 4 of Patent No. 2,056,024, having a grooved body part to receive the edge of the glass and a continuous outer flexible buttress flap 3, of substantially triangular section, which inclines downwards and outwards. The strip 2 may be of a solid section, as shown in the said Patent No. 2,056,024 or it may be divided or slit from the base upwards, as shown at 4 in Figure 1, to form a hinged flap portion, as described and claimed in Patent No. 2,246,409.

The fixed frame which receives the panel and which is secured within the window aperture, comprises a base portion 5, upon which the strip is seated, having a downwardly sloping portion forming a sloping recess 6 to receive the buttress flap 3 of the strip, and terminating in an upstanding longitudinal lip 7 over which the said flap is adapted to be sprung or forced. The upper surface of the base has a continuous transverse slope from the rear wall 9 to the front lip 7. The rear wall 9 is integral with the base to form a support for the rear wall of the strip 2, but instead of the said rear wall being vertical, with an overhanging lip on its upper edge, as described in Patent No. 2,056,024, it is of an inwardly curved or arcuate form, so as to overhang the base, the curvature commencing at a point adjacent the base. The rear wall of the channel or body part of the rubber strip 2 is shaped at 10 to a curved form corresponding or complementary to the shape of the frame wall 9, so as to be adapted to mate therewith, and at its upper edge it may be provided with an outwardly-extending longitudinal lip 11 adapted to engage closely over the outer edge of the curved frame wall 9, flush therewith. When the window panel 1 with attached edging strip 2 is inserted into the frame by movement in a direction at right-angles to its plane, the curved rear wall 10 of the rubber strip will engage the curved wall 9 of the frame wall, and the latter will act as a lead or guide, causing the strip to be forced downwards until it fully mates with the overhanging frame wall, the said strip being thereby firmly bedded down upon the base, and the upper lip 11 being drawn tightly down on to the outer edge of the wall. The underside of the base 5 may be provided with an integral depending flange 12 at its rear edge, flush with the rear upstanding wall 9 so as to form a continuous outer surface therewith. Or a depending flange may be provided at any other position on the underside of the base.

In the modification shown in Figure 2, the rear wall 9 of the frame base 5 is inwardly inclined to overhang the base, being straight instead of curved; and the rear wall 10 of the rubber strip 2 is correspondingly inclined to mate with said wall. The strip has a lip 11 to engage the edge of the rear wall as in Figure 1. The inclined wall 9 acts as a lead or guide for the strip when the window is being mounted in the frame, functioning in the same manner as the curved wall in Figure 1.

A further modification is shown in Figure 3 wherein the base 5 carries a curved integral wall 9 at one edge and is provided at its opposite edge with a wide lip or ledge 7 which is extended downwards, at its outer side, to form a depending flange 12. The strip 2 may be solid, as shown, or divided as in Figure 1.

I claim:

Window glazing means comprising a window-aperture frame or surround having a base provided with an upstanding lip at one side and with an integral upstanding wall at the other side, said wall being inwardly sloped from its lowermost part so as to overhang the base part for its entire depth, and the upper surface of the base part having a continuous upward slope from the lip to the upstanding wall, in combination with a rubber channel member adapted to receive an edge of the window panel and to be seated upon the said base part, said channel member having at one side a flexible resilient retaining flap or flange adapted to be engaged over the lip of the base part and having at the opposite side a wall which is sloped inwardly from its lower edge to correspond with the inwardly sloped wall of the frame base part so as to co-operate and mate therewith, the said wall of the frame base part being designed to form a lead which, when engaged by the channel member, co-operates therewith to cause the said member to be automatically bedded down on to the base part during the mounting of the window panel within the frame.

FRED ALEXANDER MAUGHAM OLDHAM.